(12) United States Patent
Jani (10) Patent No.: US 10,237,354 B2
(45) Date of Patent: Mar. 19, 2019

(54) TECHNOLOGIES FOR OFFLOADING A VIRTUAL SERVICE ENDPOINT TO A NETWORK INTERFACE CARD

(71) Applicant: Intel Corporation, Santa Clara, CA (US)

(72) Inventor: Nrupal R. Jani, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 48 days.

(21) Appl. No.: 14/496,417

(22) Filed: Sep. 25, 2014

(65) Prior Publication Data

US 2016/0094667 A1    Mar. 31, 2016

(51) Int. Cl.
*H04L 29/08*    (2006.01)
*H04L 12/803*    (2013.01)
*G06F 9/4401*    (2018.01)
*G06F 9/455*    (2018.01)

(52) U.S. Cl.
CPC ............ *H04L 67/16* (2013.01); *G06F 9/4411* (2013.01); *G06F 9/455* (2013.01); *G06F 9/45558* (2013.01); *H04L 47/122* (2013.01); *H04L 67/10* (2013.01); *H04L 69/32* (2013.01); *G06F 2009/45579* (2013.01)

(58) Field of Classification Search
CPC ......... H04L 67/16; H04L 69/32; H04L 67/10; H04L 47/122
USPC .................................................. 709/202–245
See application file for complete search history.

(56) References Cited

U.S. PATENT DOCUMENTS

| | | | |
|---|---|---|---|
| 8,792,353 B1 * | 7/2014 | Janarthanan | H04L 47/10 370/236 |
| 2005/0060535 A1 * | 3/2005 | Bartas | H04L 63/02 713/154 |
| 2006/0036551 A1 * | 2/2006 | Oliveira | H04N 21/835 705/51 |

(Continued)

OTHER PUBLICATIONS

International Search Report for PCT application No. PCT/US2015/046746, dated Dec. 24, 2015, 3 pages.

(Continued)

*Primary Examiner* — David R Lazaro
*Assistant Examiner* — Berhanu Shitayewoldetadik
(74) *Attorney, Agent, or Firm* — Barnes & Thornburg LLP (57) ABSTRACT

Technologies for offloading virtual service endpoint capabilities include a compute node and network controller. A device driver of a compute device may discover offloaded virtual service endpoint capability of a network interface card of the compute device. The device driver may advertise the offloaded virtual service endpoint capability to a network agent and virtual network functions provided by the compute device. An out-of-band tag may be associated with the offloaded virtual service endpoint to identify network packets to be processed by the offloaded virtual service endpoint. The network agent may add a flow entry to a forwarding table of a network switch of the compute device based on network flow information received from the network controller. The network agent may also associate the added flow entry with the offloaded virtual service endpoint based on the out-of-band tag and configure the offloaded virtual service endpoint based on the network flow information.

26 Claims, 4 Drawing Sheets

(56) References Cited

U.S. PATENT DOCUMENTS

| | | | |
|---|---|---|---|
| 2006/0104308 A1* | 5/2006 | Pinkerton | H04L 63/0485 370/469 |
| 2006/0227773 A1* | 10/2006 | Grewal | H04L 63/123 370/389 |
| 2007/0121615 A1* | 5/2007 | Weill | H04L 12/4633 370/389 |
| 2008/0189769 A1* | 8/2008 | Casado | G06F 21/6281 726/4 |
| 2009/0219936 A1* | 9/2009 | Tripathi | H04L 41/00 370/392 |
| 2009/0303921 A1* | 12/2009 | Manchanda | H04W 84/18 370/328 |
| 2012/0082161 A1 | 4/2012 | Leung et al. | |
| 2012/0250686 A1 | 10/2012 | Vincent et al. | |
| 2012/0317566 A1* | 12/2012 | Santos | G06F 9/45558 718/1 |
| 2013/0254766 A1 | 9/2013 | Zuo et al. | |
| 2013/0343181 A1* | 12/2013 | Stroud | H04L 43/50 370/229 |
| 2013/0343399 A1 | 12/2013 | Kandula et al. | |

OTHER PUBLICATIONS

Written Opinion for PCT application No. PCT/US2015/046746, dated Dec. 24, 2015, 5 pages.

* cited by examiner

TECHNOLOGIES FOR OFFLOADING A VIRTUAL SERVICE ENDPOINT TO A NETWORK INTERFACE CARD

BACKGROUND

Telecommunication and other data network functions are increasingly virtualized and consolidated into network servers. For example, network functions such as packet switching, packet filtering, and intrusion detection that historically have been provided by dedicated or proprietary hardware appliances are now virtualized and provided by virtual machines executing on off-the-shelf servers, desktop computers, network switches, and other devices that are instantiated on-the-fly based on workload requirements. However, each virtualized network function requires a different amount of overhead based on the particular network function being provided. For example, a virtualized network function that performs a deep packet inspection of network packets received from a remote computing device may require more overhead per packet than the amount of overhead per packet required by a virtualized network function that performs web caching.

A growing trend among network services providers is to chain together virtualized network functions to provide tailored network service offerings based on customer needs without requiring customers to purchase and/or install dedicated or proprietary hardware appliances. For example, a service provider may define a chain of individual virtualized network security functions (e.g., a virtualized firewall function, a virtualized intrusion detection function, etc.), each of which is configured to process, in a particular order, network packets received from a remote computing device. Based on customer workload requirements and/or the per packet overhead associated with each of the virtualized network functions defined in the chain, multiple instances of a particular virtualized network functions may be instantiated. However, such practice introduces additional complexity into the forwarding decisions required to steer network packets through the chain of individual virtualized network functions.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
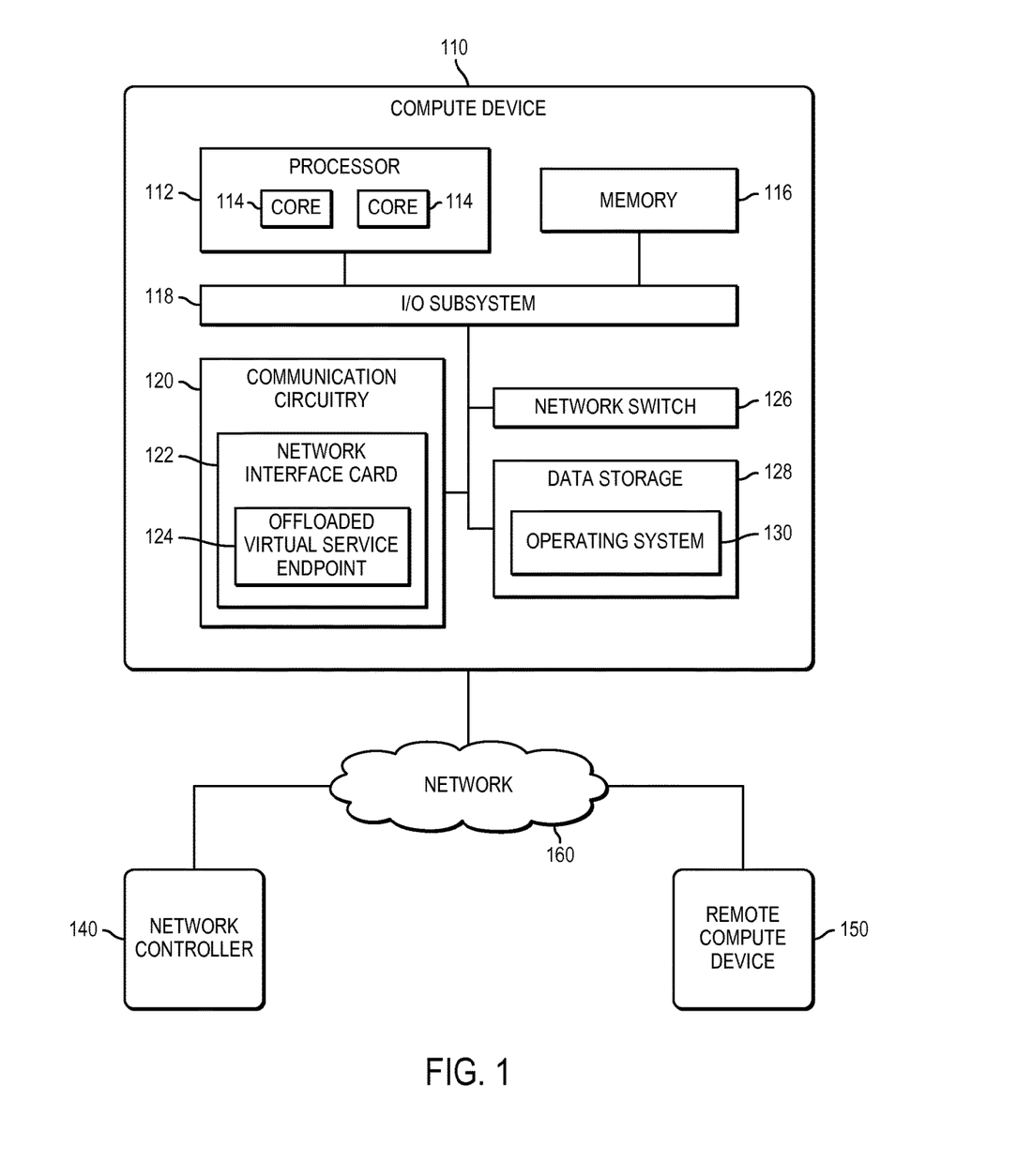
FIG. 1 is a simplified block diagram of at least one embodiment of a system for offloading a virtual service endpoint to a network interface card of a compute device.

Referring now to FIG. 1, in an illustrative embodiment, a system 100 for offloading a virtual service endpoint includes a compute device 110, a network controller 140, and a remote compute device 150, each of which may be capable of communicating via a network 160 and operating in a software-defined networking (SDN) environment and/or a network functions virtualization (NFV) environment. As discussed in more detail below, the compute device 110 instantiates one or more virtual machines to perform any number of computational tasks or workloads (e.g., virtual network functions or services) according to a service function chain. The service function chain defines or otherwise specifies an ordered set (e.g., a sequence, etc.) of virtual network functions or services (e.g., firewall services, network address translation services, load balancing services, deep packet inspection services, TCP optimization services, etc.) that are to be performed on network packets received from remote compute devices such as, for example, the remote compute device 150. In operation, after a received network packet has been processed by one virtual network function, it must be forwarded to the next virtual network function for processing based on the order defined by the service function chain.

In the illustrative embodiment, the compute device 110 is configured to offload a portion (e.g., a subset, etc.) of packet forwarding decisions from a network switch 126 (e.g., a virtual switch or a hardware switch) of the compute device 110 to a virtual service endpoint (e.g., the offloaded virtual service endpoint 124) of a network interface card 122 of the compute device 110. To do so, the network interface card 122 advertises offloaded virtual service endpoint capability. In response to discovering the offloaded virtual service endpoint capability of the network interface card 122, a network agent executed by the compute device 110 associates the offloaded virtual service endpoint 124 with an out-of-band tag. As discussed in more detail below, the out-of-band tag is used by the offloaded virtual service endpoint (VSE) 124 to identify network packets that are received from one virtual network function provided by the compute device 110 and, according to the service function chain, are to be processed by another virtual network function provided by the compute device 110. After associating the offloaded VSE 124 with the out-of-band tag, the network agent adds a network flow to a forwarding table of the network switch 126 based on network flow information received from the network controller 140 and the out-of-band tag associated with the offloaded VSE 124. In some embodiments, the network flow information received from the network controller 140 is based at least in part on the ordered set (e.g., a sequence, etc.) of virtual network functions or services specified by the service function chain. Additionally, the network agent configures the offloaded VSE 124 based on the network flow information received from the network controller 140. It should be appreciated that by offloading a portion of the packet forwarding decisions from the network switch 126 of the compute device 110 to the offloaded VSE 124, a number of processing cycles are freed up and made available to the virtual machines for performing other computational tasks or workloads (e.g., virtual network functions or services).

Additionally, in the illustrative embodiment, the offloaded VSE 124 of the network interface card 122 is configured to forward network packets from one virtual network function to another virtual network function based on the order specified by the service function chain. To do so, the network switch 126 of the compute device 110 receives a network packet from a virtual network function after the virtual network function has completed its processing of the network packet. The network switch 126 may determine, based on its forwarding table or information received from the network controller 140 or another controller (e.g., a network functions virtualization controller), whether the virtual network function from which the network packet was received is the last virtual network function to be performed on or to otherwise process the network packet. In response to determining that the virtual network function from which the network packet was received is not the last virtual network function to be performed on or to otherwise process the network packet, the network switch 126 tags the network packet with the out-of-band tag. The network packet is then forwarded by the network switch 126 to the offloaded VSE 124, which in response to determining that the network packet is tagged with the out-of-band tag, identifies the next virtual network function to which the network packet should be forwarded.

The compute device 110 may be embodied as, or otherwise include, any type of computing device capable of performing the functions described herein including, but not limited to a server computer, a desktop computer, a laptop computing device, a consumer electronic device, a mobile computing device, a mobile phone, a smart phone, a tablet computing device, a personal digital assistant, a wearable computing device, a smart television, a smart appliance, and/or other type of computing device. As illustratively shown in FIG. 1, the compute device 110 includes a processor 112, a memory 116, an input/output (I/O) subsystem 118, communication circuitry 120, and a data storage 128. Of course, the compute device 110 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 116, or portions thereof, may be incorporated in the processor 112 in some embodiments.

The processor 112 may be embodied as any type of processor capable of performing the functions described herein. For example, in some embodiments, the processor 112 may be embodied as a single core processor, digital signal processor, microcontroller, or other processor or processing/controlling circuit. In other embodiments, such as the one illustratively shown in FIG. 1, the processor 112 may be embodied as a multi-core processor having multiple processor cores 114. In such embodiments, each processor core 114 of the processor 112 is capable of executing one or more applications.

In some embodiments, the processor 112 may include hardware-based, hardware-assisted, or hardware-accelerated support for virtualization such as, for example, virtual machine extensions (VMX) support. In such embodiments, the VMX support facilitates virtualized execution of operating systems by providing two modes of execution: VMX-root mode and VMX non-root mode. The VMX-root mode allows executing software to have broad control of the compute device 110 and its hardware resources. Accordingly, a virtual machine monitor (VMM) or hypervisor may execute in VMX-root mode. The VMX non-root mode restricts access to certain hardware instructions while still implementing the ordinary ring/privilege system of the processor 112. Thus, one or more guest virtual machines (VMs) and/or operating systems (OSs) may execute in the VMX non-root mode. Those guest OSs may execute in ring zero, similar to execution without virtualization. The VMX support may be embodied as, for example, Intel® VT-x technology.

The memory 116 may be embodied as any type of volatile or non-volatile memory or data storage capable of performing the functions described herein. In operation, the memory 116 may store various data and software used during operation of the compute device 110 such as operating systems, applications, programs, libraries, and drivers. The memory 116 is communicatively coupled to the processor 112 via the I/O subsystem 118, which may be embodied as circuitry and/or components to facilitate input/output operations with the processor 112, the memory 116, and other components of the compute device 110. For example, the I/O subsystem 118 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 118 may form a portion of a system-on-a-chip (SoC) and be incorporated, along with the processor 112, the memory 116, and other components of the compute device 110, on a single integrated circuit chip.

The communication circuitry 120 of the compute device 110 may be embodied as any type of communication circuit, device, or collection thereof, capable of enabling communications between the compute device 110, the network controller 140, the remote compute device 150, and/or other computing devices via one or more communication networks (e.g., local area networks, personal area networks, wide area networks, cellular networks, a global network such as the Internet, etc.) such as network 160. The communication circuitry 120 may be configured to use any one or more communication technologies (e.g., wireless or wired communications) and associated protocols (e.g., Ethernet, Wi-Fi®, WiMAX, etc.) to effect such communication. In the illustrative embodiment, the communication circuitry 120 includes a network interface card 122 configured to communicatively couple the compute device 110 to the network controller 140, the remote compute device 150, and/or any other compute device. As discussed in more detail below, the network interface card 122 of the compute device 110 includes or otherwise provides an offloaded virtual service endpoint (VSE) 124. In some embodiments, the offloaded VSE 124 is configured to determine the next virtual network function in a chain of virtual network functions to process a network packet received from the remote compute device 150 and/or another virtual network function.

The network switch 126 of the compute device 110 may be embodied as any type of communication circuit, device, hardware logic, firmware, software, and/or collection or combination thereof, capable of enabling communications and forwarding of network packets between components and/or modules (e.g., ports, virtual machines, etc.) of the compute device 110. For example, in some embodiments, the network switch 126 may be embodied as a hardware switch included or otherwise embedded in the communication circuitry 120 and/or the network interface card 122 of the compute device 110. Additionally or alternatively, the network switch 126 may be embodied as a virtual or software switch (e.g., the virtual switch 220 illustratively shown in FIG. 2). Regardless of the specific type of network switch, the network switch 126 of the compute device 110 may be capable of operating in a software-defined networking (SDN) environment and/or a network functions virtualization (NFV) environment. As such, the network switch 126 may be associated with a forwarding table that includes network flow entries added in response to network flow information received from the network controller 140.

The data storage 128 may be embodied as any type of device or devices configured for short-term or long-term storage of data such as, for example, memory devices and circuits, memory cards, hard disk drives, solid-state drives, or other data storage devices. For example, the data storage 128 may be configured to store an operating system 130 to be initialized and/or executed by the compute device 110. In some embodiments, portions of the operating system 130 may be copied to the memory 116 during operations for faster processing and/or any other reason.

The network controller 140 may be embodied as, or otherwise include, any type of computing device capable of performing the functions described herein including, but not limited to, a server computer, a desktop computer, a laptop computing device, a consumer electronic device, a mobile computing device, a mobile phone, a smart phone, a tablet computing device, a personal digital assistant, a wearable computing device, a smart television, a smart appliance, and/or other type of computing or networking device. As such, the network controller 140 may include devices and structures commonly found in a network controller or similar computing devices such as processors, memory devices, communication circuitry, and data storages, which are not shown in FIG. 1 for clarity of the description. In the illustrative embodiment, the network controller 140 is capable of operating in a software-defined networking (SDN) environment and/or a network functions virtualization (NFV) environment. As such, the network controller 140 may send (e.g., transmit, etc.) network flow information to the compute device 110 and/or other computing devices capable of operating in an SDN environment and/or a NFV environment. For instance, the network controller 140 may transmit network flow information such as, for example, a flow identifier and a flow tuple (e.g., a source IP address, a source port number, a destination IP address, a destination port number, and a protocol) of network packets associated with a network flow. In some embodiments, the network flow information transmitted by the network controller 140 includes identification information that identifies source and destination virtual network functions (e.g., the virtual network functions 210 shown in FIG. 2) and/or virtual machines (e.g., the virtual machines 204 shown in FIG. 2) for network packets associated with a network flow.

The remote compute device 150 may be embodied as, or otherwise include, any type of computing device capable of performing the functions described herein including, but not limited to a desktop computer, a laptop computing device, a server computer, a consumer electronic device, a mobile computing device, a mobile phone, a smart phone, a tablet computing device, a personal digital assistant, a wearable computing device, a smart television, a smart appliance, and/or other type of computing device. As such, the remote compute device 150 may include devices and structures commonly found in computing devices such as processors, memory devices, communication circuitry, and data storages, which are not shown in FIG. 1 for clarity of the description. In some embodiments, the remote compute device 150 may be configured to transmit and/or receive network packets to/from the compute device 110.

Figure 2:
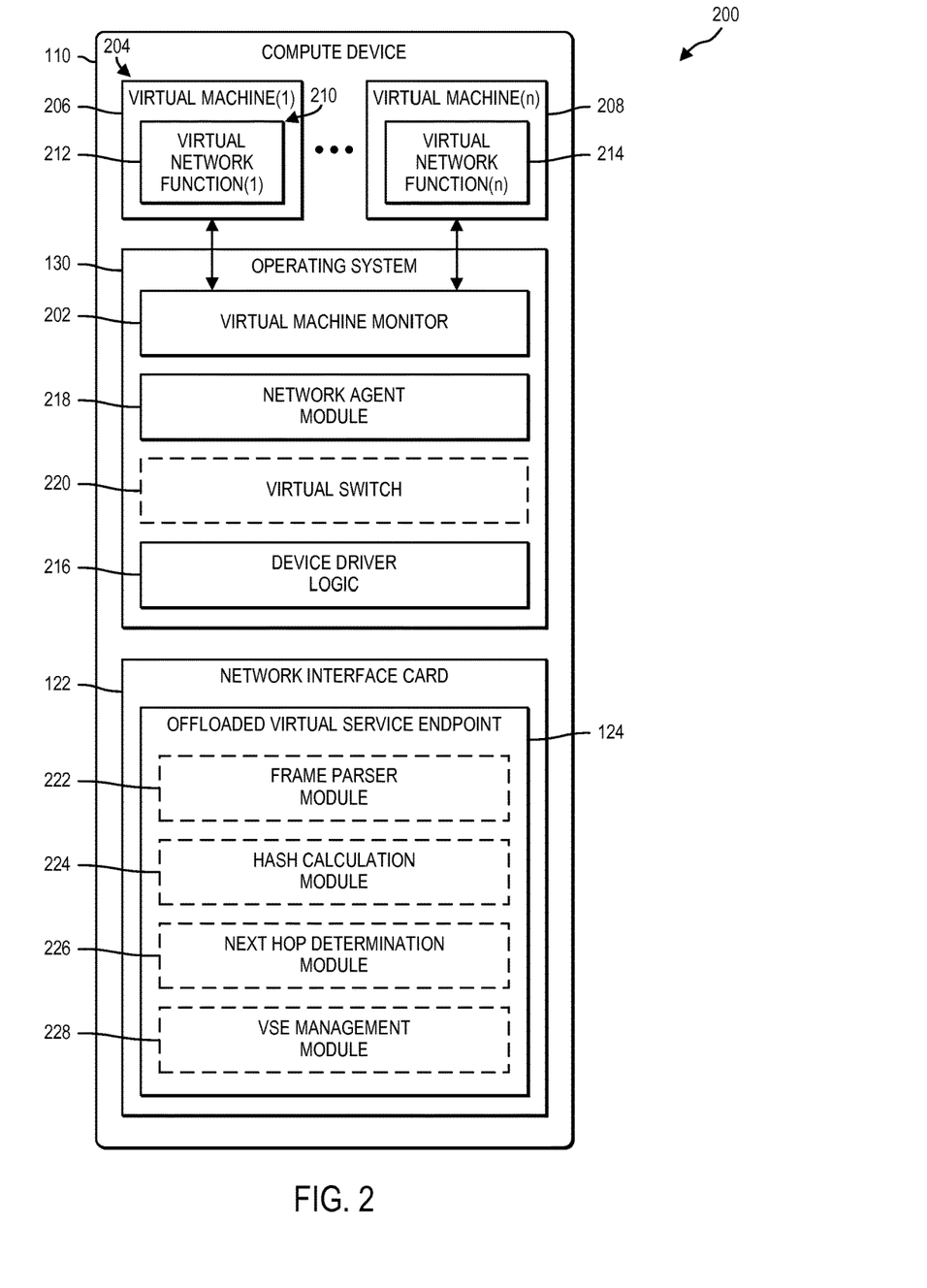
FIG. 2 is a simplified block diagram of at least one embodiment of an environment of the compute device of the system of FIG. 1.

Referring now to FIG. 2, in use, the compute device 110 establishes an environment 200 during operation. The illustrative environment 200 includes the operating system 130, a virtual machine monitor (VMM) 202, one or more virtual machines (VMs) 204, device driver logic 216, a network agent module 218, the network interface card 122, and the offloaded VSE 124. Although illustrated as including two VMs 204 (e.g., the virtual machine(1) 206 and the virtual machine(n) 208, it should be understood that other embodiments may include additional VMs 204. As discussed, in some embodiments, the network switch 126 is embodied as a virtual or software switch. In such embodiments, the operating system 130 includes the virtual switch 220. Additionally, in some embodiments, the offloaded VSE 124 includes a frame parser module 222, a hash calculation module 224, a next hop determination module 226, and a virtual service endpoint management module 228. Each of the modules, logic, and other components of the environment 200 may be embodied as hardware, software, firmware, or a combination thereof. For example, each of the modules, logic and other components of the environment 200 may form a portion of, or otherwise be established by, the processor 112 or other hardware components of the compute device 110. It should be appreciated that the compute device 110 may include other components, subcomponents, modules, and devices commonly found in a computing device, which are not illustrated in FIG. 2 for clarity of the description.

The virtual machine monitor (VMM) 202 or hypervisor may be embodied as any virtual machine monitor, hypervisor, specialized operating system, or other component that allows and manages the execution of multiple virtualized workloads on the compute device 110. For example, the VMM 202 allows multiple guest operating systems and/or other applications to execute concurrently on the compute device 110. In the illustrative embodiment, the VMM 202 is executed in a privileged or root mode of the compute device 110 and has substantially full control of the hardware resources of the compute device 110.

Each of the virtual machines (VMs) 204 (e.g., the virtual machine(1) 206 and the virtual machine(n) 208 are executed as a guest on the VMM 202. That is, the VMs 204 are executed in a non-privileged or non-root mode. Each of the VMs 204 is configured to perform a compute workload, such as a network functions virtualization (NFV) workload on network packets received from the remote compute device 150 and/or another virtual machine (VM) 204 executed on the VMM 202. To do so, each virtual machine (VM) 204 includes a virtual network function 210 configured to process or otherwise perform a particular service or function on received network packets. For example, each virtual network function 210 may provide or perform, among others, one or more firewall services, network address translation services, load balancing services, deep packet inspection services, and/or TCP optimization services on network packets received from the remote compute device 150 and/or another virtual network function 210. Although illustrated as including two VMs 204 (e.g., the virtual machine(1) 206 and the virtual machine(n) 208, it should be understood that other embodiments may include additional VMs 204. In some embodiments, after processing a network packet by one virtual network function 210 (e.g., the virtual network function(1) 212), the network packet is forwarded to another virtual network function 210 (e.g., the virtual network function(n) 214) based on a chain or an ordered set (e.g., a sequence, etc.) of virtual network functions 210 or services. In such embodiments, each of the virtual network functions 210 is configured to forward the processed network packet to the network switch 126 (e.g., the virtual switch 220 and/or the hardware switch) of the compute device 110. As discussed in more detail below, a portion of the packet forwarding decisions are offloaded from the network switch 126 to the offloaded virtual service endpoint (VSE) 124 of the network interface card 122.

The operating system (OS) 130 may be embodied as any type of OS, or other similar set of instructions, for performing the functions and/or providing the features described herein. For example, in various embodiments, the OS 130 may be embodied as a version of Windows®, which is commercially available from Microsoft Corp. of Redmond, Wash.; a version of Linux (including Android™, which is commercially available from Google, Inc. of Mountain View, Calif.); OS X®, which is commercially available from Apple Inc. of Cupertino, Calif., a version of UNIX®; and/or any other type of OS 130. In use, the OS 130 may manage hardware and software resources for one or more applications executed by the compute device 110. In some embodiments, the OS 130 may be configured to communicate and/or interact with the network interface card 122 via the device driver logic 216. For example, during initialization of the OS 130 by the compute device 110, the OS 130 (via an associated OS loader or other component) may initialize and/or load the device driver logic 216, which may be configured to enable the OS 130 to interact and/or communicate with the network interface card 122 and/or the offloaded VSE 124 of the network interface card 122.

As discussed, the device driver logic 216 may be initialized by the operating system (OS) 130 and may be configured to interact or otherwise interface with the network interface card 122 and the network agent module 218. In the illustrative embodiment, the device driver logic 216 is configured to discover the offloaded VSE capability of the network interface card 122. That is, the device driver logic 216 is configured to discover the offloaded VSE 124 embedded or otherwise included with the network interface card 122. As discussed, in some embodiments, the network interface card 122 is configured to advertise that it includes offloaded VSE capability to devices and/or components (e.g., hardware devices, logic, drivers, modules, virtual machines, workload controllers, operating systems, etc.) of the compute device 110. In such embodiments, the device driver logic 216 may be configured to discover the offloaded VSE capability in response to receiving a message and/or signal from the network interface card 122. Additionally or alternatively, the device driver logic 216 may be configured to discover the offloaded VSE capability in response to examining one or more registers of the network interface card 122 and/or the compute device 110 indicating that the network interface card 122 includes offloaded VSE capabilities.

In response to discovering the offloaded VSE capability, the device driver logic 216 is also configured to advertise the offloaded VSE capability of the network interface card 122 to the network agent module 218. Additionally, in some embodiments, the device driver logic 216 may also advertise the offloaded VSE capability of the network interface card 122 to one or more of the virtual network functions 210. It should be appreciated that the device driver logic 216 may be configured to advertise the VSE capability of the network interface card 122 to any other devices or components (e.g., hardware devices, logic, drivers, modules, virtual machines, workload controllers, operating systems, etc.) of the compute device 110.

The device driver logic 216 is also configured to associate the offloaded VSE 124 of the network interface card 122 with an out-of-band tag. The out-of-band tag may be used by devices or components of the compute device 110 to identify network packets that are received from one virtual network function 210 (e.g., the virtual network function(1) 212) and, according to a service function chain or another ordered set of virtual network functions to be performed, are to be processed by another virtual network function 210 (e.g., the virtual network function(n) 214). For example, in some embodiments, the offloaded VSE 124 is configured to perform a portion (e.g., a subset, etc.) of packet forwarding processing for received network packets determined to include the out-of-band tag, as discussed below. In some embodiments, the out-of-band tag may be locally generated by the device driver logic 216 or it may be embodied as a preconfigured or reference tag. In other embodiments, the out-of-band tag may be generated by a different component and/or device of the compute device 110 and received by the device driver logic 216 for association with the offloaded VSE 124. Although an out-of-band tag is associated with the offloaded VSE 124 in the illustrative embodiment, any other type of tag or identifier may be associated with the offloaded VSE 124.

The device driver logic 216 is also configured to transmit the out-of-band tag associated with the offloaded VSE 124 to one or more devices and/or components (e.g., hardware devices, logic, drivers, modules, virtual machines, workload controllers, operating systems, etc.) of the compute device 110 to facilitate packet forwarding decisions. For example, in the illustrative embodiment, the device driver logic 216 is configured to transmit the out-of-band tag to the network agent module 218. In some embodiments, the network agent module 218 transmits the out-of-band tag to the network controller 140 to facilitate future forwarding decisions, as discussed below. It should be appreciated that the device driver logic 216 may also be configured to transmit any other type of information to the network agent module 218 for subsequent transmission to the network controller 140 and use in facilitating packet forwarding decisions.

The network agent module 218 may be initialized by the operating system (OS) 130 and may be configured to interact or otherwise interface with the network controller 140. For example, in the illustrative embodiment, the network agent module 218 is configured to receive network flow information associated with a network flow from the network controller 140. The network flow information may be indicative of the particular virtual network function 210 to which network packets associated with the network flow should be forwarded. Additionally or alternatively, the network flow information may be indicative of a different compute device (e.g., a different compute device communicatively coupled to the compute device 110 via the network 160) to which network packets associated with the network flow should be forwarded. The network flow information received from the network controller 140 includes a flow identifier and a flow tuple (e.g., a source IP address, a source port number, a destination IP address, a destination port number, and a protocol) corresponding to a particular network flow. It should be appreciated that the network flow information may include any other type or combination of information corresponding to a particular network flow. For example, in some embodiments, the network flow information received from the network controller 140 may also include next hop information that identifies destination and/or next virtual network functions 210 and/or VMs 204 for network packets associated with a particular network flow. Additionally or alternatively, the network flow information received from the network controller 140 may also include the out-of-band tag associated with the offloaded VSE 124. In some embodiments, the network agent module 218 is embodied as a software-defined networking (SDN) agent executed by the OS 130 and/or another component of the compute device 110.

In some embodiments, the network agent module 218 may be configured to receive the network flow information from the network controller 140 as one or more OpenFlow messages. Additionally or alternatively, the network agent module 218 may be configured to receive the network information from the network controller 140 as one or more Simple Object Access Protocol (SOAP) messages. Of course it should be appreciated that any other suitable messaging and/or notification protocol (e.g., representational state transfer (REST) message, Extensible Markup Language (XML), etc.) may be used by the network agent module 218 to receive the network flow information from the network controller 140.

The network agent module 218 is also configured to interact or otherwise interface with the network switch 126 of the compute device 110. For example, in some embodiments, the compute device 110 includes the virtual switch 220, as discussed below. In such embodiments, the network agent module 218 is configured to interact or otherwise interface with the virtual switch 220 based on the network flow information received from the network controller 140. Additionally or alternatively, in embodiments in which the compute device 110 includes a hardware switch, the network agent module 218 is configured to interact or otherwise interface with the hardware switch based on the network flow information received from the network controller 140. Irrespective of the type of network switch 126 (e.g., the virtual switch 220 or the hardware switch) that the compute device 110 includes, the network agent module 218 is configured to add one or more network flow entries to a forwarding table associated with the network switch 126. The network flow entries added to the forwarding table includes the flow identifier, the flow tuple, and/or any other type or combination of information corresponding to a particular network flow.

In some embodiments, the network agent module 218 is configured to associate the flow entries added to the forwarding table of the network switch 126 with the offloaded VSE 124 based at least in part on, or otherwise as a function of, the out-of-band tag. In such embodiments, the network agent module 218 configures one or more of the flow entries added to the forwarding table to include an action that causes the network switch 126 (e.g., the virtual switch 220 and/or the hardware switch) to tag matching network packets with the out-of-band tag. The out-of-band tag used to configure the action of the flow entries added to the forwarding table may be received from the device driver logic 216 and/or from the network controller 140.

The network agent module 218 is also configured to update or otherwise configure the offloaded VSE 124 of the network interface card 122 based on the network flow information received from the network controller 140. For example, in some embodiments, the network agent module 218 configures and/or updates the offloaded VSE 124 based on the next hop information received from the network controller 140. In such embodiments, the offloaded VSE 124 may utilize the next hop information to determine the next virtual network function 210 (e.g., the virtual network function(n) 214) to process a particular network packet determined to include the out-of-band tag. Of course, the network agent module 218 may configure and/or update the offloaded VSE 124 based on information received from a different controller, such as, for example, a network functions virtualization (NFV) workload controller of the compute device 110. For example, in some embodiments, the network agent module 218 configures and/or updates the offloaded VSE 124 with one or more reference hash values, each of which uniquely identifies a different one of the virtual network functions 210 and/or the VMs 204. In such embodiments, the hash values may be received from the network controller 140 and/or the different controller, or they may be generated by the network agent module 218 based on the information received from the network controller 140 and/or the different controller. As discussed in more detail below, the offloaded VSE 124 may identify the next virtual network function 210 to process a received network packet based on determining which reference hash value matches a hash value calculated from the received network packet.

As discussed, in some embodiments, the OS 130 also includes the virtual switch 220. Although the virtual switch 220 is executed by the operating system in the illustrative embodiment, the virtual switch 220 may be executed or initialized by other devices or components of the compute device 110. For example, in some embodiments, the virtual switch 220 may be executed by the VMM 202 or one of the VMs 204. The virtual switch 220 is configured to forward network packets and/or information between components and/or modules (e.g., ports, virtual machines, etc.) of the compute device 110. To do so, virtual switch 220 may be associated with a forwarding table that includes network flow entries added in response to network flow information received from the network controller 140. In some embodiments, the virtual switch 220 is capable of operating in a software-defined networking (SDN) environment and/or a network functions virtualization (NFV) environment. It should be appreciated that in embodiments in which the network switch 126 is instead embodied as a hardware switch, the hardware switch may include functionality similar to the virtualized functionality of the virtual switch 220.

As discussed, the network interface card 122 includes the offloaded VSE 124. The offloaded VSE 124 is configured to offload a portion (e.g., a subset, etc.) of the packet forwarding decisions from the network switch 126 (e.g., the virtual switch 220 and/or the hardware switch) of the compute device 110. That is, the offloaded VSE 124 is configured to perform a portion of the packet forwarding decisions instead of the network switch 126 for network packets received from the virtual network functions 210. It should be appreciated that by offloading a portion of the forwarding decisions from a network switch 126, such as, for example, the virtual switch 220 to the offloaded VSE 124, a number of processing cycles are freed up and made available to the VMs 204 for performing computational tasks or workloads (e.g., virtual network functions or services).

To facilitate offloading the portion of the forwarding decisions from the network switch 126, the offloaded VSE 124 is configured to determine whether a network packet received from the network switch 126 (e.g., the virtual switch 220 and/or the hardware switch) is tagged or otherwise associated with the out-of-band tag. To do so, in some embodiments, the offloaded VSE 124 includes the frame parser module 222. The frame parser module 222 of the offloaded VSE 124 is configured to extract one or more header fields of the network packet received from the network switch 126. For example, in some embodiments, the frame parser module 222 is configured to extract a 5-tuple and/or various other header fields including OSI layer information or data (e.g., data link layer information, network layer information, transport layer information, session layer information, presentation layer information, and/ or application layer information) from the network packet. In some embodiments, the offloaded VSE 124 is configured to examine the extracted header field(s) to determine whether the network packet is tagged or otherwise associated with the out-of-band tag. If the offloaded VSE 124 determines that the network packet is tagged with the out-of-band tag, the required packet forwarding decisions for the network packet are made by the offloaded VSE 124 rather than the network switch 126. In such cases, the offloaded VSE 124 is configured to determine the next virtual network function 210 (e.g., the virtual network function(n) 214) in the chain of virtual network functions to process or otherwise be performed on the network packet received from the network switch 126 and tagged with the out-of-band tag.

In some embodiments, the offloaded VSE 124 includes the hash calculation module 224 and the next hop determination module 226 to facilitate determining the next virtual network function 210 (e.g., the virtual network function(n) 214) in the chain of virtual network functions to process or otherwise be performed on the network packet received from the network switch 126. In such embodiments, the hash calculation module 224 is configured to calculate a hash value based on the header field(s) extracted from the network packet by the frame parser module 222. The next hop determination module 226 is configured to then utilize the calculated hash value to determine the next virtual network function 210 (e.g., the virtual network function(n) 214) in the chain of virtual network functions to process or otherwise be performed on the network packet received from the network switch 126. To do so, in some embodiments, the next hop determination module 226 is configured to compare the calculated hash value to various reference hash values, each of which uniquely identifies a different one of the virtual network functions 210 and/or the VMs 204. In such embodiments, the next hop determination module 226 is configured to identify the next virtual network function 210 to process the network packet based on determining which reference hash value matches the calculated hash value. As discussed, the reference hash values may be received from the network agent module 218.

The offloaded VSE 124 is also configured to forward network packets received from the network switch 126. For example, in embodiments in which the network packet received from the network switch 126 is tagged with the out-of-band tag, the offloaded VSE 124 is configured to forward the network packet to the identified next virtual network function 210 (e.g., the virtual network function(n) 214). Additionally, in embodiments in which the network packet received from the network switch 126 is not tagged with the out-of-band tag, the offloaded VSE 124 is configured to forward the network packet to a different compute device (e.g., a different compute device communicatively coupled to the compute device 110 via the network 160).

In some embodiments, the offloaded VSE 124 also includes the VSE management module 228. In such embodiments, the VSE management module 228 is configured to transmit updated network traffic statistics to the network agent module 218, which may in turn may transmit the updated network traffic statistics to the network controller 140. It should be appreciated that the updated traffic statistics may be used by the network controller 140, the network agent module 218, and/or the offloaded VSE 124 to make future forwarding decisions.

Figure 3:
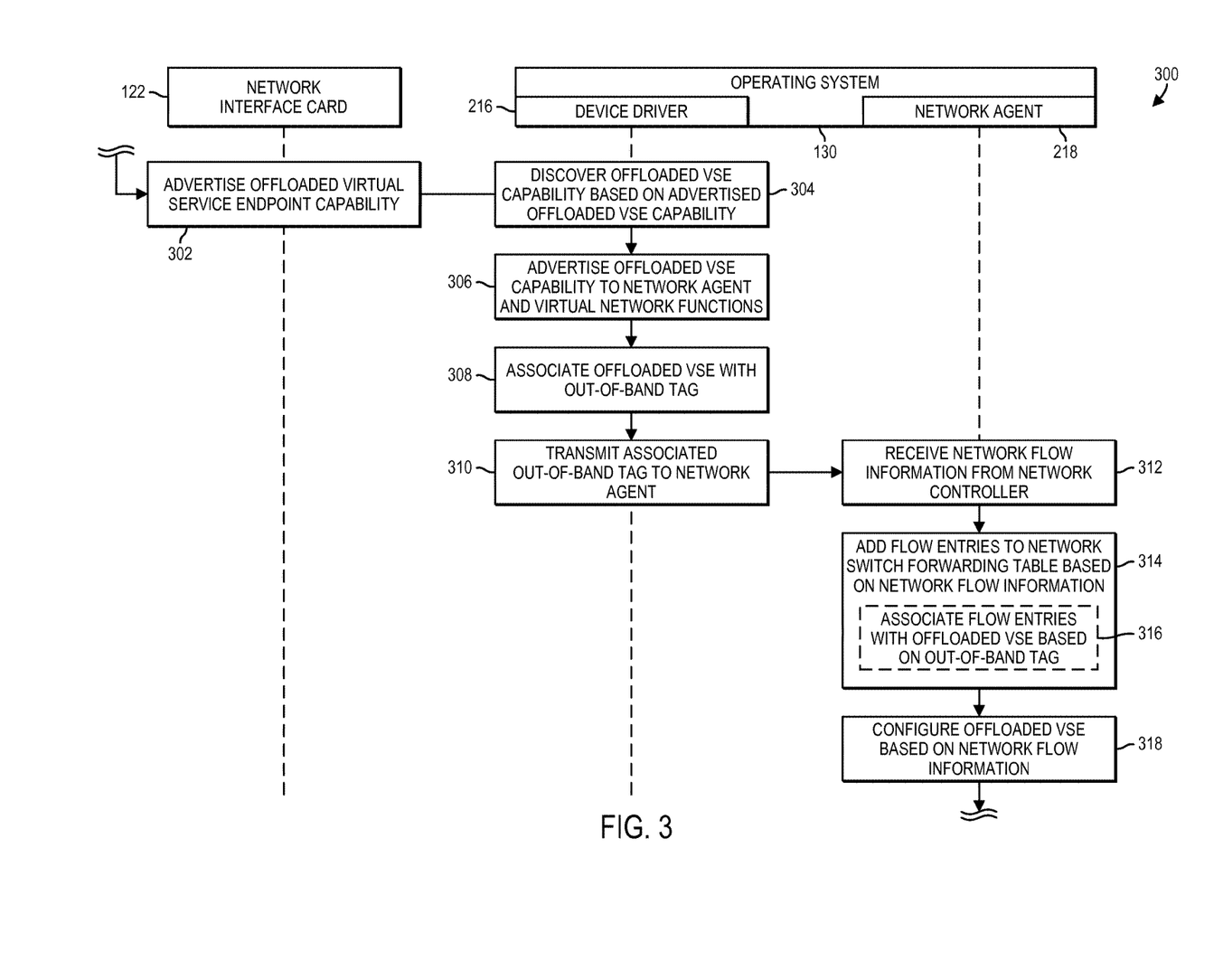
FIG. 3 is a simplified flow diagram of at least one embodiment of a method for offloading a virtual service endpoint to a network interface card that may be executed by the compute device of the system of FIG. 1.

Referring now to FIG. 3, the compute device 110 may execute a method 300 for offloading virtual service endpoint capabilities to an offloaded virtual service endpoint (VSE) 124 of the network interface card 122. The method 300 begins with block 302 in which the network interface card 122 advertises offloaded VSE capability to devices and/or components (e.g., hardware devices, logic, drivers, modules, virtual machines, workload controllers, operating systems, etc.) of the compute device 110. That is, the network interface card 122 advertises that it includes the offloaded VSE 124. To do so, in some embodiments, the network interface card 122 generates a notification message or signal indicating that it includes offloaded VSE capabilities. In such embodiments, the notification message or signal may be transmitted to various devices and components of the compute device 110 upon system initialization (e.g., during the booting processes) and/or in response to a request or polling by the devices and components of the compute device 110. Additionally or alternatively, the network interface card 122 or another component of the compute device 110 (e.g., a BIOS subsystem, the processor 112, the I/O subsystem 118, etc.) may set or otherwise configure one or more registers of the network interface card 122 and/or the compute device 110 to indicate that the network interface card 122 includes offloaded VSE capabilities. Such registers may be set or configured during the booting process, prior to the booting process, and/or at any other time in which a register may be configured.

In block 304, the device driver 216 of the compute device 110 discovers the offloaded VSE capability of the network interface card 122. To do so, in some embodiments, the device driver 216 may receive a notification message or signal from the network interface card 122 advertising the offloaded VSE capability as discussed above. In embodiments in which a register is configured by the network interface card 122 and/or another component of the compute device 110, the device driver 216 may be configured to examine the register to discover the offloaded VSE capability of the network interface card 122.

In block 306, the device driver 216 advertises the offloaded VSE capability of the network interface card 122 to the network agent 218 (e.g., a software-defined networking agent). As discussed, the network agent 218 may be executed by the OS 130, the VMM 202, the virtual switch 220, and/or any other component or device of the compute device 110. In some embodiments, the device driver 216 also advertises the offloaded VSE capability of the network interface card 122 to the virtual network function(s) 210 and/or the virtual machine(s) 204.

In block 308, the device driver 216 associates the offloaded VSE 124 with an out-of-band tag. As discussed below, the out-of-band tag is used by the offloaded VSE 124 to identify network packets that are received from one virtual network function 210 (e.g., the virtual network function(1) 212) and, according to the service function chain, are to be processed by another virtual network function 210 (e.g., the virtual network function(n) 214). The out-of-band tag may be generated by the device driver 216 and/or it may be embodied as a preconfigured or reference tag.

After associating the out-of-band tag with the offloaded VSE 124, the device driver 216 transmits the out-of-band tag to the network agent 218 in block 310. In some embodiments, the network agent 218 transmits the out-of-band tag to the network controller 140 to facilitate future forwarding decisions. It should be appreciated that the device driver 216 may also transmit any other type of information to the network agent 218 for subsequent transmission to the network controller 140 and use in future forwarding decisions.

In block 312, the network agent 218 of the compute device 110 receives network flow information associated with a network flow from the network controller 140 (e.g., a software-defined networking controller). The network flow information may be indicative of the particular virtual network function 210 to which network packets associated with the network flow should be forwarded. Additionally or alternatively, the network flow information may be indicative of a different compute device (e.g., a different compute device communicatively coupled to the compute device 110 via the network 160) to which network packets associated with the network flow should be forwarded. In some embodiments, the network flow information received from the network controller 140 includes a flow identifier and a flow tuple (e.g., a source IP address, a source port number, a destination IP address, a destination port number, and a protocol) corresponding to the network flow. It should be appreciated that the network flow information may include any other type or combination of information corresponding to a particular network flow. For example, in some embodiments, the network flow information received from the network controller 140 may also include next hop information that identifies destination and/or next virtual network functions 210 and/or virtual machines (VMs) 204 for network packets associated with a network flow. Additionally or alternatively, the network flow information received from the network controller 140 may also include the out-of-band tag associated with the offloaded VSE 124.

In block 314, the network agent 218 adds one or more network flow entries to the forwarding table associated with the network switch 126 of the compute device 110. As discussed, the network switch 126 of the compute device 110 may be embodied as a virtual switch 220 executed by the VMM 202, the OS 130 of the compute device 110, and/or a different virtual machine (VM) 204 of the compute device 110. Additionally or alternatively, the network switch 126 of the compute device 110 may be embodied as a hardware switch, which may be embedded or otherwise included in the network interface card 122 and/or the communication circuitry 120. The network flow entries added to the forwarding table includes the flow identifier, the flow tuple, and/or any other type or combination of information corresponding to a particular network flow.

In some embodiments, in block 316, the network agent 218 associates the flow entries with the offloaded VSE 124 based on the out-of-band tag. In such embodiments, the network agent 218 configures one or more of the flow entries added to the forwarding table to include an action that causes the network switch 126 (e.g., the virtual switch 220 and/or the hardware switch) to tag matching network packets with the out-of-band tag. The out-of-band tag used to configure the action of the flow entries added to the forwarding table may be received from the device driver 216 and/or from the network controller 140.

In block 318, the network agent 218 configures the offloaded VSE 124 based on the network flow information received from network controller 140. For example, in some embodiments, the network agent 218 configures and/or updates the offloaded VSE 124 based on the next hop information received from the network controller 140. Additionally or alternatively, the network agent 218 configures and/or updates the offloaded VSE 124 based on information received from a different controller, such as, for example, a NFV controller. In some embodiments, the network agent 218 configures and/or updates the offloaded VSE 124 with one or more reference hash values, each of which uniquely identifies a different one of the virtual network functions 210 and/or the VMs 204. In such embodiments, the hash values may be received from the network controller 140 and/or the different controller or they may be generated by the network agent 218 based on the information received from the network controller 140 and/or the different controller. As discussed in more detail below, the offloaded VSE 124 may identify the next virtual network function 210 to process a received network packet based on determining which reference hash value matches a hash value calculated from the received network packet.

Figure 4:
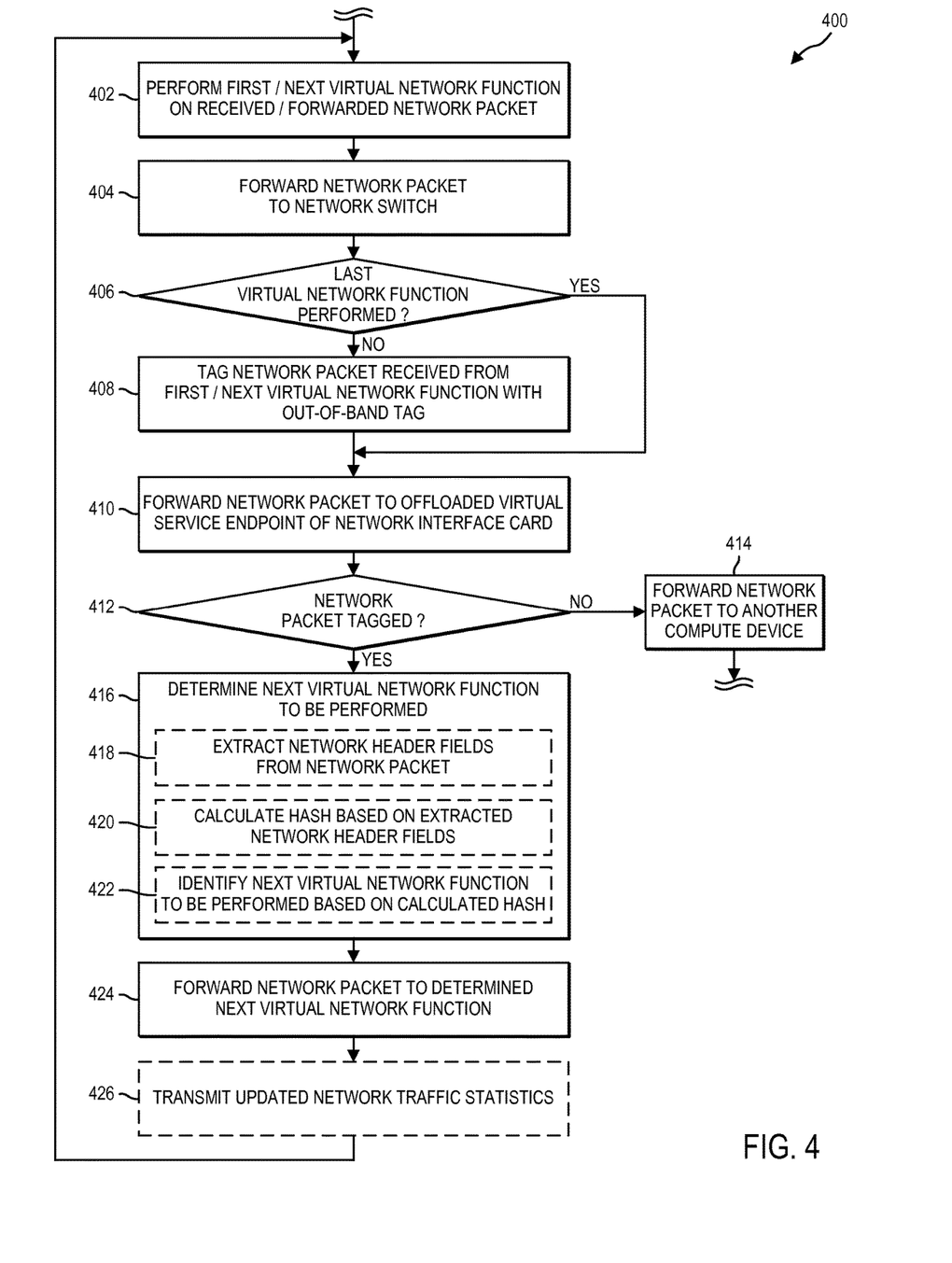
FIG. 4 is a simplified flow diagram of at least one embodiment of a method for processing network packets using an offloaded virtual service endpoint that may be executed by the compute device of the system of FIG. 1.

Referring now to FIG. 4, the compute device 110 may execute a method 400 for virtual network function processing of network packets using the offloaded virtual service endpoint (VSE) 124. The method 400 begins with block 402 in which the first/next virtual network function 210 processes a network packet received from the remote compute device 150. It should be appreciated that during the first iteration of the method 400, the first virtual network function 210 (e.g., the virtual network function(1) 212) of the chain of virtual network functions 210 processes the network packet received from the remote compute device 150. As discussed above, each virtual network function 210 of the chain of virtual network functions (e.g., the service function chain) may process or otherwise perform a particular service or function on received network packets. For example, each virtual network function 210 may provide or perform, among others, one or more firewall services, network address translation services, load balancing services, deep packet inspection services, and/or TCP optimization services on network packets received from the remote compute device 150 and/or another virtual network function 210. After processing the network packet by the first/next virtual network function 210 (e.g., the virtual network function(1) 212 during the first iteration), the method 400 advances to block 404 in which the first/next virtual network function 210 forwards the network packet to a network switch 126 of the compute device 110. The network switch 126 of the compute device 110 may be embodied as a virtual switch 220 executed by the VMM 202, the OS 130 of the compute device 110, and/or a different VM 204 of the compute device 110. Additionally or alternatively, the network switch 126 of the compute device 110 may be embodied as a hardware switch, which may be embedded or otherwise included in the network interface card 122 and/or the communication circuitry 120.

In decision block 406, the network switch 126 (e.g., the virtual switch 220 and/or the hardware switch) determines whether the first/next virtual network function 210 (e.g., the virtual network function(1) 212 during the first iteration) from which the network packet was received is the last virtual network function to be performed on or to otherwise process the network packet. To do so, in some embodiments, the network switch 126 may compare header fields of the received network packet to a forwarding table, which may include network flow entries added in response to network flow information received from the network controller 140. Additionally or alternatively, the network switch 126 (e.g., the virtual switch 220 and/or the hardware switch) may determine whether the first/next virtual network function 210 from which the network packet was received is the last virtual network function to be performed based on information received from a different controller, such as, for example, a NFV controller. If, in decision block 406, the network switch 126 determines that the first/next virtual network function 210 (e.g., the virtual network function(1) 212 during the first iteration) from which the network packet was received is the last virtual network function to be performed, the method 400 advances to block 410. If, however, the network switch 126 determines instead that the first/next virtual network function 210 from which the network packet was received is not the last virtual network function to be performed, the method 400 advances to block 408.

In block 408, the network switch 126 (e.g., the virtual switch 220 and/or the hardware switch) tags the network packet received from the first/next virtual network function 210 (e.g., the virtual network function(1) 212 during the first iteration) with an out-of-band tag. The out-of-band tag identifies, to the offloaded VSE 124, network packets that are received from one virtual network function 210 (e.g., the virtual network function(1) 212) and are to be processed by another virtual network function 210 (e.g., the virtual network function(n) 214). After tagging the network packet received from the first/next virtual network function 210, the method 400 advances to block 410.

In block 410, the network switch 126 (e.g., the virtual switch 220 and/or the hardware switch) forwards the network packet received from the first/next virtual network function 210 (e.g., the virtual network function(1) 212 during the first iteration) to the offloaded VSE 124 for further processing (e.g., determination of the next virtual network function 210 to be performed, forward the network packet to another compute device, etc.). It should be appreciated that the network packet forwarded by the network switch 126 to the offloaded VSE 124 may or may not be associated with the out-of-band tag as discussed above in blocks 406 and 408.

In decision block 412, the offloaded VSE 124 determines whether the network packet received from the first/next virtual network function 210 is tagged with the out-of-band tag. To do so, in some embodiments, the offloaded VSE 124 examines one or more header fields of the received network packet to determine whether it has been tagged. If, in decision block 412, the offloaded VSE 124 determines that the network packet is not tagged with the out-of-band tag, the method 400 advances to block 414 and the offloaded VSE 124 forwards the network packet to another compute device (e.g., a different compute device communicatively coupled to the compute device 110 via the network 160). If, however, the offloaded VSE 124 determines instead that the network packet is tagged with the out-of-band tag, the method 400 advances instead to block 416.

In block 416, the offloaded VSE 124 of the compute device 110 determines a next virtual network function 210 (e.g., the virtual network function(n) 214) in the chain of virtual network functions to process or otherwise be performed on the received network packet. To do so, in some embodiments, the offloaded VSE 124 determines the next virtual network function 210 to process the received network packet based on header information associated with the received network packet. In such embodiments, in block 418, the offloaded VSE 124 extracts one or more header fields (e.g., a 5-tuple, various OSI data link layer, network layer, transport layer, session layer, presentation layer, and/or application layer header fields, etc.) from the received network packet. Subsequently, in block 420, the offloaded VSE 124 calculates a hash value based on the extracted header fields. Then, in block 422, the offloaded VSE 124 utilizes the calculated hash value to identify the next virtual network function 210 (e.g., the virtual network function(n) 214) to process the received network packet. In some embodiments, the offloaded VSE 124 compares the calculated hash value to various reference hash values, each of which uniquely identifies a different one of the virtual network functions 210 and/or the VMs 204. In such embodiments, the offloaded VSE 124 identifies the next virtual network function 210 to process the network packet based on determining which reference hash value matches the calculated hash value. As discussed, the reference hash values may be generated by the network agent 218 based on information received from the network controller 140 (e.g., the next hop information) and/or information received from a different controller (e.g., an NFV workload controller). Additionally or alternatively, the reference hash values may be generated by compute devices and/or components other than the network agent 218. In such cases, the generated reference hash values may be received directly from the other compute devices and/or components.

In block 424, the offloaded VSE 124 of the compute device 110 forwards (e.g., transmits, routes, sends, etc.) the received network packet to the determined next virtual network function 210 (e.g., the virtual network function(n) 214). To do so, in some embodiments, the offloaded VSE 124 substitutes or otherwise replaces the destination MAC address of the received network packet with the MAC address of the next virtual network function 210 (e.g., the virtual network function(n) 214). As discussed, the next virtual network function 210 (e.g., the virtual network function(n) 214) may be configured to further process the network packet upon receipt.

In some embodiments, in block 426, the offloaded VSE 124 transmits updated network traffic statistics to the network agent 218, which may in turn transmit the updated network traffic statistics to the network controller 140. It should be appreciated that the updated traffic statistics may be used by the network controller 140, the network agent 218, and/or the offloaded VSE 124 to make future forwarding decisions.

EXAMPLES

Illustrative examples of the technologies disclosed herein are provided below. An embodiment of the technologies may include any one or more, and any combination of, the examples described below.

Example 1 includes a compute device to offload virtual service endpoint capabilities, the compute device including a network interface card to advertise offloaded virtual service endpoint capability; a device driver logic initialized by an operating system of the compute device to: (i) discover the offloaded virtual service endpoint capability advertised by the network interface card, (ii) advertise the offloaded virtual service endpoint capability to a network agent initialized by the operating system and a plurality of virtual network functions executed on a plurality of virtual machines of the compute device, and (iii) associate an offloaded virtual service endpoint of the network interface card with an out-of-band tag, wherein the out-of-band tag identifies network packets to be processed by the offloaded virtual service endpoint; a network switch to forward network packets based on a forwarding table of the network switch; and wherein the network agent is to: (i) add a flow entry to the forwarding table based on network flow information received from a network controller, (ii) associate the flow entry added to the forwarding table with the offloaded virtual service endpoint based on the out-of-band tag, and (iii) configure the offloaded virtual service endpoint of the network interface card based on the network flow information.

Example 2 includes the subject matter of Example 1, and wherein the device driver logic is further to transmit the out-of-band tag associated with the offloaded virtual service endpoint of the network interface card to the network agent; and wherein the network agent is further to receive the network flow information from the network controller.

Example 3 includes the subject matter of any of Examples 1 and 2, and wherein the network flow information received from the network controller includes a flow tuple that indicates a source and a destination of network packets associated with a network flow and next hop information that identifies a next virtual network function of the plurality of virtual network functions to process network packets associated with the network flow.

Example 4 includes the subject matter of any of Examples 1-3, and wherein to configure the offloaded virtual service endpoint of the network interface card includes to configure the offloaded virtual service endpoint of the network interface based on the next hop information of the received network flow information.

Example 5 includes the subject matter of any of Examples 1-4, and wherein the network agent is further to transmit the out-of-band tag associated with the offloaded virtual service endpoint of the network interface card to the network controller; and wherein the network flow information received from the network controller further includes the out-of-band tag associated with the offloaded virtual service endpoint of the network interface card.

Example 6 includes the subject matter of any of Examples 1-5, and further including a virtual network function of the plurality of virtual network functions to (i) process a network packet received from a remote compute device and (ii) forward the network packet to the network switch of the compute device; wherein the network switch is to (i) determine whether the virtual network function is a last virtual network function to process the network packet, (ii) tag the network packet received from the virtual network function with the out-of-band tag in response to a determination that the virtual network function is not the last virtual network function to process the network packet, and (iii) forward the network packet to the offloaded virtual service endpoint of the network interface card; and wherein the offloaded virtual service endpoint is to (i) determine whether the network packet is tagged with the out-of-band tag, (ii) determine a next virtual network function of the plurality of virtual network functions to process the network packet in response to a determination that the network packet is tagged with the out-of-band tag, and (iii) forward the network packet to the determined next virtual network function to process the network packet.

Example 7 includes the subject matter of any of Examples 1-6, and wherein the offloaded virtual service endpoint is further to forward the network packet to another compute device in response to a determination that the network packet is not tagged with the out-of-band tag.

Example 8 includes the subject matter of any of Examples 1-7, and wherein to determine the next virtual network function to process the network packet includes to (i) extract network header fields from the network packet, (ii) calculate a hash based on the extracted network header fields, and (iii) identify the next virtual network function to process the network packet based on the calculated hash.

Example 9 includes the subject matter of any of Examples 1-8, and wherein the offloaded virtual service endpoint is further to transmit network traffic statistics associated with the offloaded virtual service endpoint to the network agent; and wherein the network agent is further to transmit the network traffic statistics received from the offloaded virtual service endpoint to the network controller.

Example 10 includes the subject matter of any of Examples 1-9, and wherein the network switch of the compute device includes a hardware switch of the network interface card of the compute device.

Example 11 includes the subject matter of any of Examples 1-10, and wherein the network switch of the compute device includes a virtual switch executed by the compute device.

Example 12 includes the subject matter of any of Examples 1-11, and wherein the virtual switch is executed by at least one of a virtual machine monitor of the compute device, the operating system of the compute device, or a virtual machine of the plurality of virtual machines.

Example 13 includes a method to offload virtual service endpoint capabilities on a compute device, the method including advertising, by a network interface card of the compute device, offloaded virtual service endpoint capability; discovering, by a device driver logic initialized by an operating system of the compute device, the offloaded virtual service endpoint capability advertised by the network interface card; advertising, by the device driver logic, the offloaded virtual service endpoint capability to a network agent initialized by the operating system and a plurality of virtual network functions executed on a plurality of virtual machines of the compute device; associating, by the device driver logic, an offloaded virtual service endpoint of the network interface card with an out-of-band tag, wherein the out-of-band tag identifies network packets to be processed by the offloaded virtual service endpoint; adding, by the network agent, a flow entry to a forwarding table of a network switch of the compute device based on network flow information received from a network controller; associating, by the network agent, the flow entry added to the forwarding table with the offloaded virtual service endpoint based on the out-of-band tag; and configuring, by the network agent, the offloaded virtual service endpoint of the network interface card based on the network flow information.

Example 14 includes the subject matter of Example 13, and further including transmitting, by the device driver logic and to the network agent, the out-of-band tag associated with the offloaded virtual service endpoint of the network interface card; and receiving, by the network agent, the network flow information from the network controller.

Example 15 includes the subject matter of any of Examples 13 and 14, and wherein the network flow information received from the network controller includes a flow tuple that indicates a source and a destination of network packets associated with a network flow and next hop information that identifies a next virtual network function of the plurality of virtual network functions to process network packets associated with the network flow.

Example 16 includes the subject matter of any of Examples 13-15, and wherein configuring the offloaded virtual service endpoint of the network interface card includes configuring the offloaded virtual service endpoint of the network interface based on the next hop information of the received network flow information.

Example 17 includes the subject matter of any of Examples 13-16, and further including transmitting, by the network agent and to the network controller, the out-of-band tag associated with the offloaded virtual service endpoint of the network interface card; and wherein the network flow information received from the network controller further includes the out-of-band tag associated with the offloaded virtual service endpoint of the network interface card.

Example 18 includes the subject matter of any of Examples 13-17, and further including processing, by a virtual network function of the plurality of virtual network functions, a network packet received from a remote compute device; forwarding, by the virtual network function, the network packet to the network switch of the compute device; determining, by the network switch, whether the virtual network function is a last virtual network function to process the network packet; tagging, by the network switch, the network packet received from the virtual network function with the out-of-band tag in response to a determination that the virtual network function is not the last virtual network function to process the network packet; forwarding, by the network switch, the network packet to the offloaded virtual service endpoint of the network interface card; determining, by the offloaded virtual service endpoint, whether the network packet is tagged with the out-of-band tag; determining, by the offloaded virtual service endpoint, a next virtual network function of the plurality of virtual network functions to process the network packet in response to a determination that the network packet is tagged with the out-of-band tag; and forwarding, by the offloaded virtual service endpoint, the network packet to the determined next virtual network function to process the network packet.

Example 19 includes the subject matter of any of Examples 13-18, and further including forwarding, by the offloaded virtual service endpoint, the network packet to another compute device in response to a determination that the network packet is not tagged with the out-of-band tag.

Example 20 includes the subject matter of any of Examples 13-19, and wherein determining the next virtual network function to process the network packet includes (i) extracting network header fields from the network packet, (ii) calculating a hash based on the extracted network header fields, and (iii) identifying the next virtual network function to process the network packet based on the calculated hash.

Example 21 includes the subject matter of any of Examples 13-20, and further including transmitting, by the offloaded virtual service endpoint and to the network agent, network traffic statistics associated with the offloaded virtual service endpoint; and transmitting, by the network agent and to the network controller, the network traffic statistics received from the offloaded virtual service endpoint.

Example 22 includes the subject matter of any of Examples 13-21, and wherein the network switch of the compute device includes a hardware switch of the network interface card of the compute device.

Example 23 includes the subject matter of any of Examples 13-22, and wherein the network switch of the compute device includes a virtual switch executed by the compute device.

Example 24 includes the subject matter of any of Examples 13-23, and wherein the virtual switch is executed by at least one of a virtual machine monitor of the compute device, the operating system of the compute device, or a virtual machine of the plurality of virtual machines.

Example 25 includes a compute device to offload virtual service endpoint capabilities, the compute device including a processor; and a memory having stored therein a plurality of instructions that when executed by the processor cause the compute device to perform the method of any of Examples 13-24.

Example 26 includes one or more machine-readable media having a plurality of instructions stored thereon that in response to being executed result in compute device performing the method of any of Examples 13-24.

Example 27 includes a compute device to offload virtual service endpoint capabilities, the compute device including means for advertising, by a network interface card of the compute device, offloaded virtual service endpoint capability; means for discovering, by a device driver logic initialized by an operating system of the compute device, the offloaded virtual service endpoint capability advertised by the network interface card; means for advertising, by the device driver logic, the offloaded virtual service endpoint capability to a network agent initialized by the operating system of the compute device and a plurality of virtual network functions executed on a plurality of virtual machines of the compute device; means for associating, by the device driver logic, an offloaded virtual service endpoint of the network interface card with an out-of-band tag, wherein the out-of-band tag identifies network packets to be processed by the offloaded virtual service endpoint; means for forwarding, by a network switch of the compute device, network packets based on a forwarding table of the network switch; means for adding, by the network agent, a flow entry to the forwarding table of the network switch based on network flow information received from a network controller; means for associating, by the network agent, the flow entry added to the forwarding table with the offloaded virtual service endpoint based on the out-of-band tag; and means for configuring, by the network agent, the offloaded virtual service endpoint of the network interface card based on the network flow information.

Example 28 includes the subject matter of Example 27, and further including means for transmitting, by the device driver logic and to the network agent, the out-of-band tag associated with the offloaded virtual service endpoint of the network interface card; and means for receiving, by the network agent, the network flow information from the network controller.

Example 29 includes the subject matter of any of Examples 27 and 28, and wherein the network flow information received from the network controller includes a flow tuple that indicates a source and a destination of network packets associated with a network flow and next hop information that identifies a next virtual network function of the plurality of virtual network functions to process network packets associated with the network flow.

Example 30 includes the subject matter of any of Examples 27-29, and wherein the means for configuring the offloaded virtual service endpoint of the network interface card includes means for configuring the offloaded virtual service endpoint of the network interface based on the next hop information of the received network flow information.

Example 31 includes the subject matter of any of Examples 27-30, and further including means for transmitting, by the network agent and to the network controller, the out-of-band tag associated with the offloaded virtual service endpoint of the network interface card; and wherein the network flow information received from the network controller further includes the out-of-band tag associated with the offloaded virtual service endpoint of the network interface card.

Example 32 includes the subject matter of any of Examples 27-31, and further including means for processing, by a virtual network function of the plurality of virtual network functions, a network packet received from a remote compute device; means for forwarding, by the virtual network function, the network packet to the network switch of the compute device; means for determining, by the network switch, whether the virtual network function is a last virtual network function to process the network packet; means for tagging, by the network switch, the network packet received from the virtual network function with the out-of-band tag in response to a determination that the virtual network function is not the last virtual network function to process the network packet; means for forwarding, by the network switch, the network packet to the offloaded virtual service endpoint of the network interface card; means for determining, by the offloaded virtual service endpoint, whether the network packet is tagged with the out-of-band tag; means for determining, by the offloaded virtual service endpoint, a next virtual network function of the plurality of virtual network functions to process the network packet in response to a determination that the network packet is tagged with the out-of-band tag; and means for forwarding, by the offloaded virtual service endpoint, the network packet to the determined next virtual network function to process the network packet.

Example 33 includes the subject matter of any of Examples 27-32, and further including means for forwarding, by the offloaded virtual service endpoint, the network packet to another compute device in response to a determination that the network packet is not tagged with the out-of-band tag.

Example 34 includes the subject matter of any of Examples 27-33, and wherein the means for determining the next virtual network function to process the network packet includes (i) means for extracting network header fields from the network packet, (ii) means for calculating a hash based on the extracted network header fields, and (iii) means for identifying the next virtual network function to process the network packet based on the calculated hash.

Example 35 includes the subject matter of any of Examples 27-34, and further including means for transmitting, by the offloaded virtual service endpoint and to the network agent, network traffic statistics associated with the offloaded virtual service endpoint; and means for transmitting, by the network agent and to the network controller, the network traffic statistics received from the offloaded virtual service endpoint.

Example 36 includes the subject matter of any of Examples 27-35, and wherein the network switch of the compute device includes a hardware switch of the network interface card of the compute device.

Example 37 includes the subject matter of any of Examples 27-36, and wherein the network switch of the compute device includes a virtual switch executed by the compute device.

Example 38 includes the subject matter of any of Examples 27-37, and wherein the virtual switch is executed by at least one of a virtual machine monitor of the compute device, the operating system of the compute device, or a virtual machine of the plurality of virtual machines.

The invention claimed is:

1. A compute device to offload virtual service endpoint capabilities, the compute device comprising:
    a network interface card to advertise an offloaded virtual service endpoint capability to forward network packets to a plurality of virtual network functions executed on a plurality of virtual machines of the compute device;
    circuitry configured to: (i) discover the offloaded virtual service endpoint capability advertised by the network interface card, (ii) advertise the offloaded virtual service endpoint capability to a network agent initialized by an operating system of the compute device and the plurality of virtual network functions, and (iii) associate an offloaded virtual service endpoint of the network interface card with an out-of-band tag, wherein the out-of-band tag identifies network packets to be processed by the offloaded virtual service endpoint;
    wherein the network agent is to: (i) add a flow entry to the forwarding table based on network flow information received from a network controller, (ii) associate the flow entry added to the forwarding table with the offloaded virtual service endpoint based on the out-of-band tag, and (iii) configure the offloaded virtual service endpoint of the network interface card based on the network flow information to determine whether a network packet includes the out-of-band tag and forward, in response to a determination that the out-of-band tag is included in the network packet, the network packet to another virtual network function identified in the flow information, wherein the another virtual network function identified in the flow information is executed in a virtual machine by the compute device; and
    a network switch to forward network packets based on a forwarding table of the network switch.

2. The compute device of claim 1, wherein the circuitry is further configured to transmit the out-of-band tag associated with the offloaded virtual service endpoint of the network interface card to the network agent; and wherein the network agent is further to receive the network flow information from the network controller.

3. The compute device of claim 2, wherein the network flow information received from the network controller comprises a flow tuple that indicates a source and a destination of network packets associated with a network flow and next hop information that identifies a next virtual network function of the plurality of virtual network functions to process network packets associated with the network flow.

4. The compute device of claim 3, wherein to configure the offloaded virtual service endpoint of the network interface card comprises to configure the offloaded virtual service endpoint of the network interface based on the next hop information of the received network flow information.

5. The compute device of claim 3, wherein the network agent is further to transmit the out-of-band tag associated with the offloaded virtual service endpoint of the network interface card to the network controller; and
wherein the network flow information received from the network controller further comprises the out-of-band tag associated with the offloaded virtual service endpoint of the network interface card.

6. The compute device of claim 1, further comprising a virtual network function of the plurality of virtual network functions to (i) process a network packet received from a remote compute device and (ii) forward the network packet to the network switch of the compute device; and
wherein the network switch is to (i) determine whether the virtual network function is a last virtual network function to process the network packet, (ii) tag the network packet received from the virtual network function with the out-of-band tag in response to a determination that the virtual network function is not the last virtual network function to process the network packet, and (iii) forward the network packet to the offloaded virtual service endpoint of the network interface card.

7. The compute device of claim 1, wherein the offloaded virtual service endpoint is to forward the network packet to another compute device in response to a determination that the network packet is not tagged with the out-of-band tag.

8. The compute device of claim 1, wherein the offloaded virtual service endpoint is to (i) extract network header fields from the network packet, (ii) calculate a hash based on the extracted network header fields, and (iii) identify the next virtual network function to process the network packet based on the calculated hash.

9. The compute device of claim 1, wherein the offloaded virtual service endpoint is further to transmit network traffic statistics associated with the offloaded virtual service endpoint to the network agent; and
wherein the network agent is further to transmit the network traffic statistics received from the offloaded virtual service endpoint to the network controller.

10. The compute device of claim 1, wherein the network switch of the compute device comprises at least one of a virtual switch executed by the compute device or a hardware switch of the network interface card of the compute device.

11. The compute device of claim 1, wherein the network switch of the compute device comprises a virtual switch executed by at least one of a virtual machine monitor of the compute device, the operating system of the compute device, or a virtual machine of the plurality of virtual machines.

12. The compute device of claim 1, wherein to advertise an offloaded virtual service endpoint capability comprises to set one or more registers of the network interface card to indicate that the network interface card includes the offloaded virtual service endpoint capability in a boot process of the compute device.

13. One or more non-transitory machine-readable media comprising a plurality of instructions stored thereon that in response to being executed by a compute device, cause the compute device to:
advertise, by a network interface card of the compute device, an offloaded virtual service endpoint capability to forward network packets to a plurality of virtual network functions executed on a plurality of virtual machines of the compute device;
discover, by a device driver logic initialized by an operating system of the compute device, the offloaded virtual service endpoint capability advertised by the network interface card;
advertise, by the device driver logic, the offloaded virtual service endpoint capability to a network agent initialized by the operating system and the plurality of virtual network functions;
associate, by the device driver logic, an offloaded virtual service endpoint of the network interface card with an out-of-band tag, wherein the out-of-band tag identifies network packets to be processed by the offloaded virtual service endpoint;
add, by the network agent, a flow entry to a forwarding table of a network switch of the compute device based on network flow information received from a network controller;
associate, by the network agent, the flow entry added to the forwarding table with the offloaded virtual service endpoint based on the out-of-band tag; and
configure, by the network agent, the offloaded virtual service endpoint of the network interface card based on the network flow information to determine whether a network packet includes the out-of-band tag and forward, in response to a determination that the out-of-band tag is included in the network packet, the network packet to another virtual network function identified in the flow information, wherein the another virtual network function identified in the flow information is executed in a virtual machine by the compute device.

14. The one or more non-transitory machine-readable media of claim 13, wherein the plurality of instructions further cause the compute device to:
transmit, by the device driver logic and to the network agent, the out-of-band tag associated with the offloaded virtual service endpoint of the network interface card; and
receive, by the network agent, the network flow information from the network controller.

15. The one or more non-transitory machine-readable media of claim 14, wherein the network flow information received from the network controller comprises a flow tuple that indicates a source and a destination of network packets associated with a network flow and next hop information that identifies a next virtual network function of the plurality of virtual network functions to process network packets associated with the network flow; and
wherein to configure the offloaded virtual service endpoint of the network interface card comprises to configure the offloaded virtual service endpoint of the network interface based on the next hop information of the received network flow information.

16. The one or more non-transitory machine-readable media of claim 15, wherein the plurality of instructions further cause the compute device to transmit, by the network agent and to the network controller, the out-of-band tag associated with the offloaded virtual service endpoint of the network interface card; and
    wherein the network flow information received from the network controller further comprises the out-of-band tag associated with the offloaded virtual service endpoint of the network interface card.

17. The one or more non-transitory machine-readable media of claim 13, wherein the plurality of instructions further cause the compute device to:
    process, by a virtual network function of the plurality of virtual network functions, a network packet received from a remote compute device;
    forward, by the virtual network function, the network packet to the network switch of the compute device;
    determine, by the network switch, whether the virtual network function is a last virtual network function to process the network packet;
    tag, by the network switch, the network packet received from the virtual network function with the out-of-band tag in response to a determination that the virtual network function is not the last virtual network function to process the network packet; and
    forward, by the network switch, the network packet to the offloaded virtual service endpoint of the network interface card.

18. The one or more non-transitory machine-readable media of claim 17, wherein the plurality of instructions further cause the compute device to forward, by the offloaded virtual service endpoint, the network packet to another compute device in response to a determination that the network packet is not tagged with the out-of-band tag.

19. The one or more non-transitory machine-readable media of claim 13, wherein to determine the next virtual network function to process the network packet comprises to (i) extract network header fields from the network packet, (ii) calculate a hash based on the extracted network header fields, and (iii) identify the next virtual network function to process the network packet based on the calculated hash.

20. The one or more non-transitory machine-readable media of claim 13, wherein the plurality of instructions further cause the compute device to:
    transmit, by the offloaded virtual service endpoint and to the network agent, network traffic statistics associated with the offloaded virtual service endpoint; and
    transmit, by the network agent and to the network controller, the network traffic statistics received from the offloaded virtual service endpoint.

21. The one or more non-transitory machine-readable media of claim 13, wherein the network switch of the compute device comprises at least one of a virtual switch executed by the compute device or a hardware switch of the network interface card of the compute device.

22. A method to offload virtual service endpoint capabilities on a compute device, the method comprising:
    advertising, by a network interface card of the compute device, an offloaded virtual service endpoint capability to forward network packets to a plurality of virtual network functions executed on a plurality of virtual machines of the compute device;
    discovering, by a device driver logic initialized by an operating system of the compute device, the offloaded virtual service endpoint capability advertised by the network interface card;
    advertising, by the device driver logic, the offloaded virtual service endpoint capability to a network agent initialized by the operating system and the plurality of virtual network functions;
    associating, by the device driver logic, an offloaded virtual service endpoint of the network interface card with an out-of-band tag, wherein the out-of-band tag identifies network packets to be processed by the offloaded virtual service endpoint;
    adding, by the network agent, a flow entry to a forwarding table of a network switch of the compute device based on network flow information received from a network controller;
    associating, by the network agent, the flow entry added to the forwarding table with the offloaded virtual service endpoint based on the out-of-band tag; and
    configuring, by the network agent, the offloaded virtual service endpoint of the network interface card based on the network flow information to determine whether a network packet includes the out-of-band tag and forward, in response to a determination that the out-of-band tag is included in the network packet, the network packet to another virtual network function identified in the flow information, wherein the another virtual network function identified in the flow information is executed in a virtual machine by the compute device.

23. The method of claim 22, further comprising:
    transmitting, by the device driver logic and to the network agent, the out-of-band tag associated with the offloaded virtual service endpoint of the network interface card;
    receiving, by the network agent, the network flow information from the network controller, wherein the network flow information received from the network controller comprises a flow tuple that indicates a source and a destination of network packets associated with a network flow and next hop information that identifies a next virtual network function of the plurality of virtual network functions to process network packets associated with the network flow; and
    wherein configuring the offloaded virtual service endpoint of the network interface card comprises configuring the offloaded virtual service endpoint of the network interface card based on the next hop information of the received network flow information.

24. The method of claim 22, further comprising:
    processing, by a virtual network function of the plurality of virtual network functions, a network packet received from a remote compute device;
    forwarding, by the virtual network function, the network packet to the network switch of the compute device;
    determining, by the network switch, whether the virtual network function is a last virtual network function to process the network packet;
    tagging, by the network switch, the network packet received from the virtual network function with the out-of-band tag in response to a determination that the virtual network function is not the last virtual network function to process the network packet; and
    forwarding, by the network switch, the network packet to the offloaded virtual service endpoint of the network interface card.

25. The method of claim 22, further comprising forwarding, by the offloaded virtual service endpoint, the network packet to another compute device in response to a determination that the network packet is not tagged with the out-of-band tag.

26. A compute device comprising:
circuitry configured to:
advertise an offloaded virtual service endpoint capability of a network interface card of the compute device to forward network packets to a plurality of virtual network functions executed on a plurality of virtual machines of the compute device;
discover the advertised offloaded virtual service endpoint capability of the network interface card;
advertise the offloaded virtual service endpoint capability to a network agent initialized by an operating system of the compute device and the plurality of virtual network functions;
associate an offloaded virtual service endpoint of the network interface card with an out-of-band tag, wherein the out-of-band tag identifies network packets to be processed by the offloaded virtual service endpoint;
add a flow entry to a forwarding table of a network switch of the compute device based on network flow information received from a network controller;
associate the flow entry added to the forwarding table with the offloaded virtual service endpoint based on the out-of-band tag; and
configure the offloaded virtual service endpoint of the network interface card based on the network flow information to determine whether a network packet includes the out-of-band tag and forward, in response to a determination that the out-of-band tag is included in the network packet, the network packet to another virtual network function identified in the flow information, wherein the another virtual network function identified in the flow information is executed in a virtual machine by the compute device.

* * * * *